US008917416B2

(12) United States Patent
Kobayashi

(10) Patent No.: US 8,917,416 B2
(45) Date of Patent: *Dec. 23, 2014

(54) DISPLAY CONTROL APPARATUS, DISPLAY CONTROL METHOD, AND PROGRAM

(75) Inventor: Hideyuki Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 13/490,769

(22) Filed: Jun. 7, 2012

(65) Prior Publication Data

US 2012/0314228 A1 Dec. 13, 2012

(30) Foreign Application Priority Data

Jun. 9, 2011 (JP) ................................ 2011-129155

(51) Int. Cl.
*H04N 1/04* (2006.01)
*H04N 1/46* (2006.01)
*G06K 15/10* (2006.01)
*G06K 15/00* (2006.01)
*G06F 3/12* (2006.01)

(52) U.S. Cl.
CPC ............ *G06F 3/1208* (2013.01); *G06F 3/1256* (2013.01); *G06F 3/1284* (2013.01)
USPC ............ 358/1.2; 358/498; 358/1.5; 358/1.12; 358/537

(58) Field of Classification Search
CPC .......... H04N 2201/02402; H04N 2201/02409; H04N 2201/02412; H04N 2201/02414; H04N 2201/3273; H04N 1/00411; H04N 1/0044; G03G 2215/00734; G03G 2215/00603; G03G 2215/00751; G03G 2215/00949; G03G 15/6558; G03G 3/125; G03G 3/1252; G03G 3/1253; G03G 3/1255; G03G 3/1257; G03G 17/212

See application file for complete search history.

(56) References Cited

U.S. PATENT DOCUMENTS

2009/0073469 A1* 3/2009 Kita et al. ...................... 358/1.9
2010/0165032 A1* 7/2010 Yoshida ........................... 347/15
2010/0302565 A1* 12/2010 Tanaka ............................ 358/1.9

FOREIGN PATENT DOCUMENTS

JP 2007004676 * 1/2007
JP 2008-160388 A 7/2008

OTHER PUBLICATIONS

Machine translation in english of JP 2007004676 to Motonori et al.*

* cited by examiner

*Primary Examiner* — Benny Q Tieu
*Assistant Examiner* — Haris Sabah
(74) *Attorney, Agent, or Firm* — Canon USA Inc IP Division

(57) ABSTRACT

An apparatus that controls a display unit to display, as a preview image, an image to be printed on a print medium by a printing apparatus that includes a function for adjusting a conveyance amount to convey a print medium in a conveyance direction by increasing or decreasing the conveyance amount as compared to a reference conveyance amount when an image of a designated size is printed acquires an adjustment amount of the conveyance amount and changes a size of the preview image with respect to the conveyance direction according to the acquired adjustment amount.

20 Claims, 14 Drawing Sheets

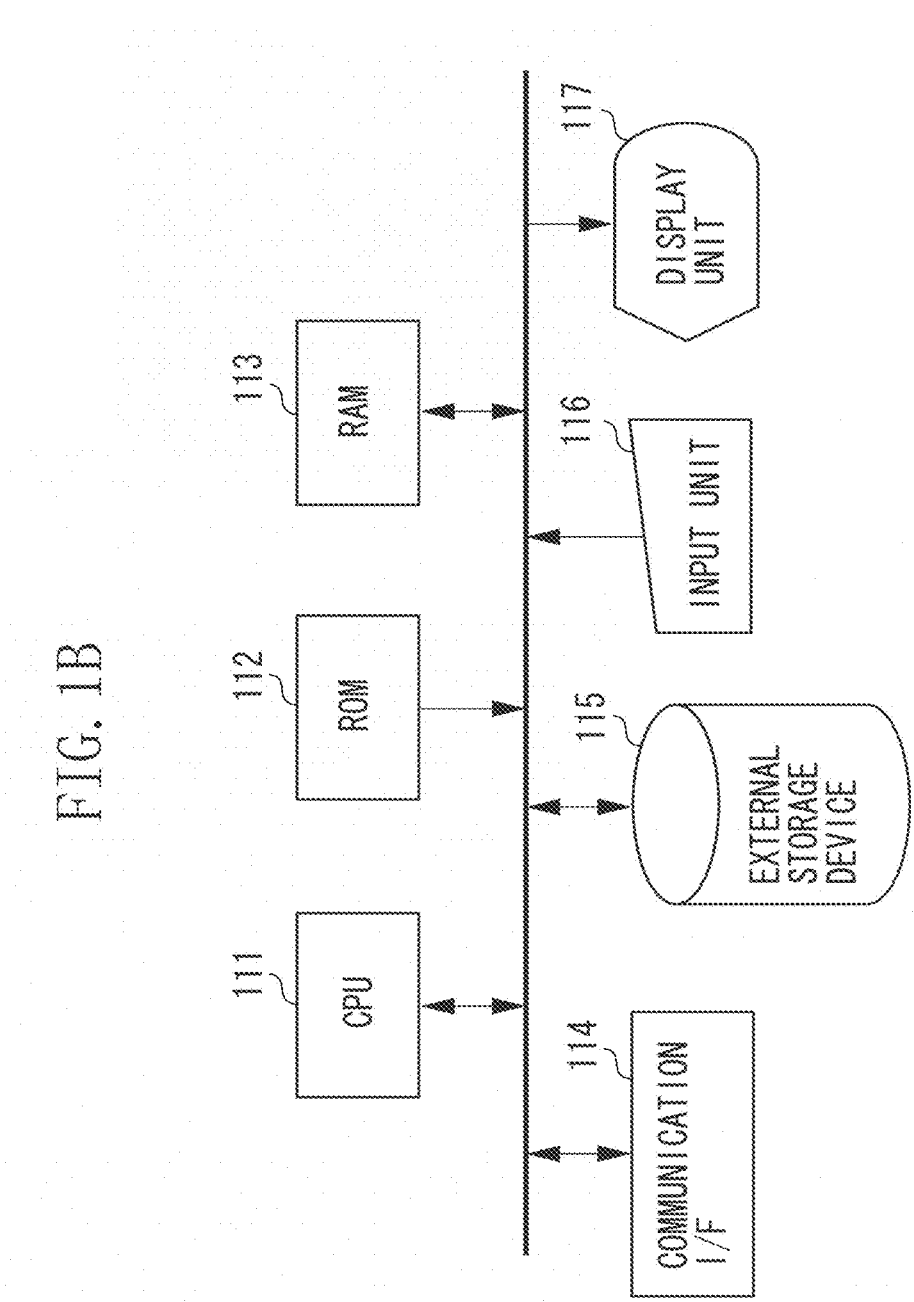

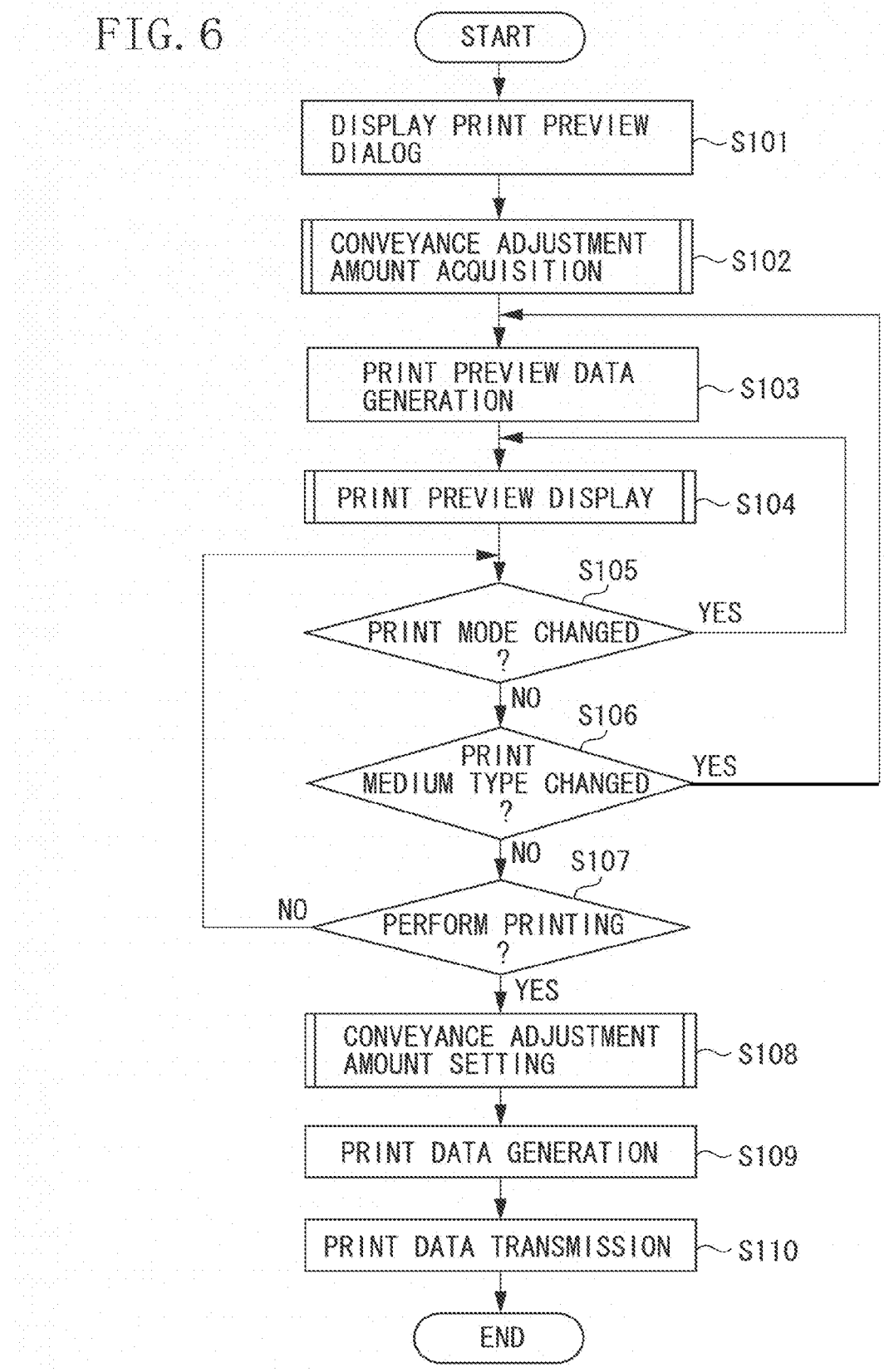

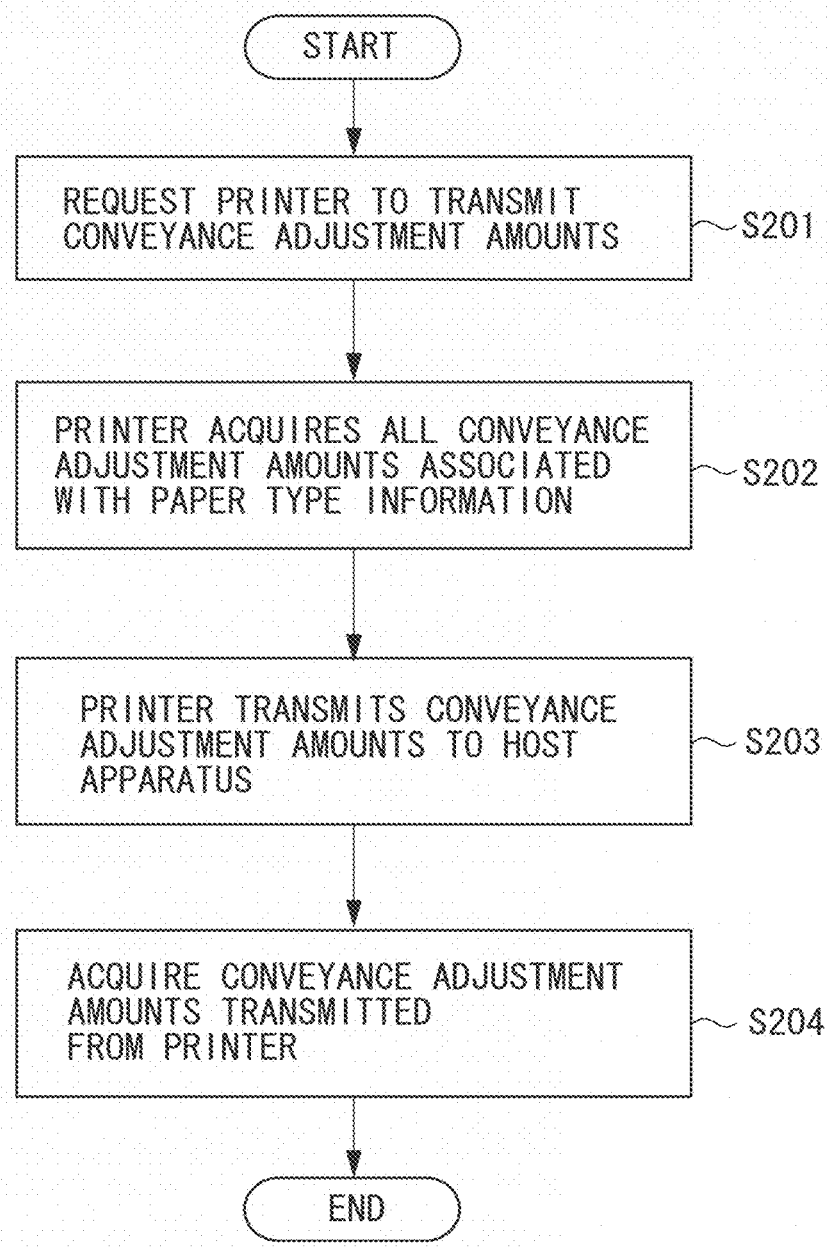

DISPLAY CONTROL APPARATUS, DISPLAY CONTROL METHOD, AND PROGRAM

BACKGROUND OF THE INVENTION

1. Field of the Invention

The present invention relates to a display control apparatus which performs preview displaying of an image to be printed on a print medium, a display control method, and a program.

2. Description of the Related Art

Conventionally, there is a print preview function that is used for allowing a user to confirm a print result before performing printing (i.e., refer to Japanese Patent Application Laid-Open No. 2008-160388). The user can confirm the print result before performing printing using the print preview function so that unintended printing can be prevented and costs of print failure can be reduced.

In a serial-scan type inkjet printer, streaks due to unevenness may be generated between regions (i.e., bands) through which a print head passes in one scan. Even when the print medium is conveyed according to a theoretical designed value, the streaks may be generated due to density between the bands becoming high when ink bleeding is easily generated in the print medium, and the density between the bands becoming low when ink bleeding is hardly generated in the print medium. To solve such an issue, there is a method for increasing, if the density between the bands becomes high, a conveyance amount of the print medium for each scan as compared to a reference conveyance amount. Further, if the density between the bands becomes low, the conveyance amount of the print medium for every scan is decreased as compared to the reference conveyance amount. The above-described streaks can thus be reduced by adjusting the conveyance amount.

However, if the function of adjusting the conveyance amount is used, a print range of an image to be printed becomes long or short in a conveyance direction as compared to when the adjustment function is not used. Conventionally, when the adjustment function is used, print previewing is performed similarly as when the adjustment function is not used. The print range to be displayed in a print preview thus becomes different from the actual print range.

SUMMARY OF THE INVENTION

According to an aspect of the present invention, an apparatus, which controls a display unit to display, as a preview image, an image to be printed on a print medium by a printing apparatus that includes a function for adjusting a conveyance amount to convey a print medium in a conveyance direction by increasing or decreasing the conveyance amount as compared to a reference conveyance amount when an image of a designated size is printed, includes a processor, where the processor is configured to control an acquiring unit configured to acquire an adjustment amount of the conveyance amount and to control a control unit configured to change a size of the preview image with respect to the conveyance direction according to the adjustment amount acquired by the acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 1A and 1B are block diagrams illustrating schematic configurations of a printing system and a host apparatus to which the present invention is applicable.

FIG. 6 is a flowchart illustrating a process for displaying a print preview according to the exemplary embodiment.

FIG. 7 is a flowchart illustrating a process for acquiring a conveyance adjustment amount according to the exemplary embodiment.

DESCRIPTION OF THE EMBODIMENTS

Various exemplary embodiments, features, and aspects of the invention will be described in detail below with reference to the drawings.

Figure 1A:
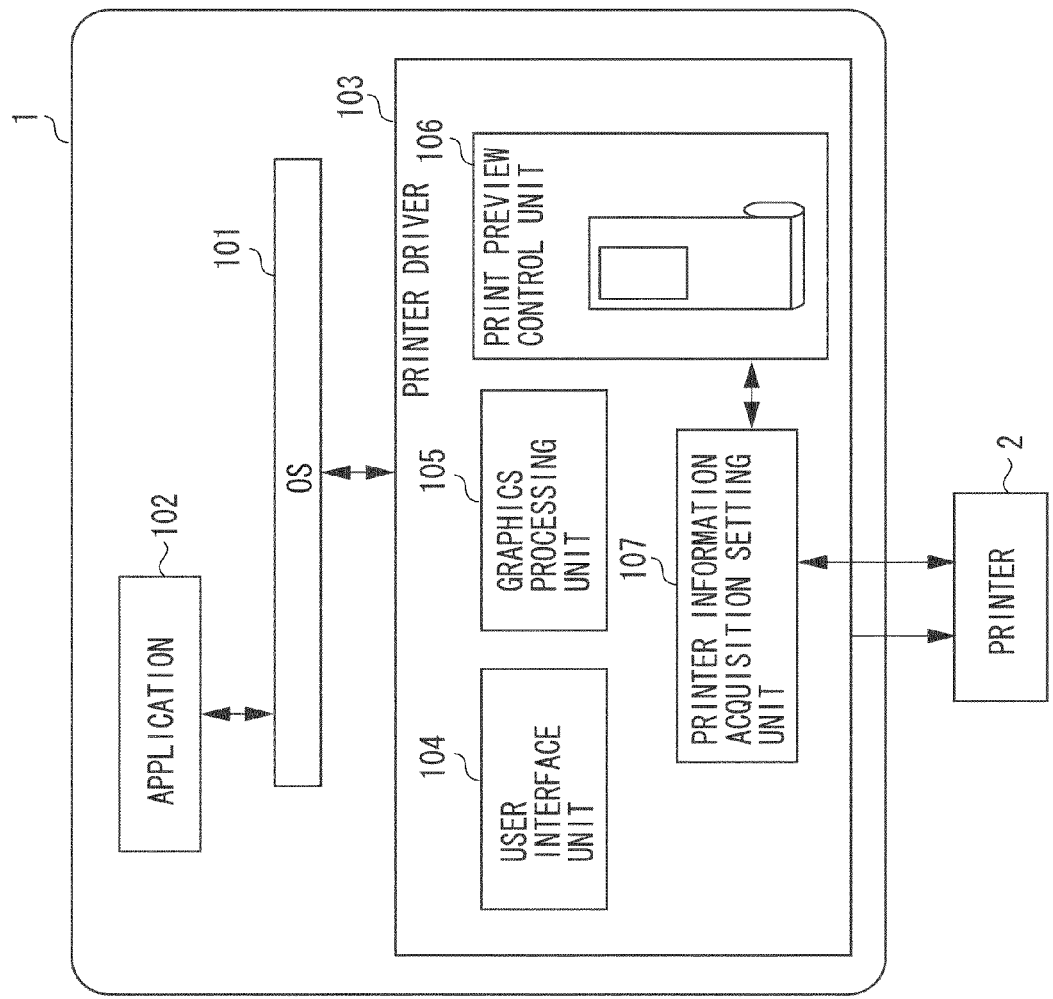

FIG. 1A is a block diagram illustrating a schematic configuration of a printing system according to a present exemplary embodiment of the present invention. Referring to FIG. 1A, the printing system includes a host apparatus 1, such as a personal computer (PC), and a printer (i.e., a printing apparatus) 2 connected to the host apparatus 1.

An operating system (OS) 101, a printer driver 103 which is software for controlling the printer 2, and an application 102 for creating various documents are installed in the host apparatus 1. The OS 101 and the printer driver 103 in the host apparatus 1 perform operations for printing the various documents created using the application 102. Further, the printer driver 103 includes the following functional units: a user interface unit 104 for receiving inputs from a user; a graphics processing unit 105 for generating print data to be transmitted to the printer 2, and a print preview control unit 106 for controlling a print preview function used in confirming a print layout and the like. In addition, the printer driver 103 includes a printer information acquisition setting unit 107 for acquiring various types of printer information, such as width information of a print medium mounted on the printer 2, current status of the printer 2, etc., and transmits information to the printer 2.

FIG. 1B is a block diagram illustrating a configuration of the host apparatus 1. Referring to FIG. 1B, a central processing unit (CPU) 111 performs various types of control in the host apparatus 1. A read-only memory (ROM) 112 stores an initialization program executed by the CPU 111 when the host apparatus 1 is activated, as well as various data pieces. A random access memory (RAM) 113 is used as a main memory or a work area of the CPU 111. An external storage device 115, such as a hard disk drive (HDD), stores various programs. Further, the external storage device (HDD) 115 loads, to the RAM 113, the programs for realizing processes illustrated in flowcharts described below. An input unit 116, such as a keyboard or a mouse, inputs various instructions to the CPU 111. A display unit 117, such as a liquid crystal display (LCD) or a cathode ray tube (CRT), displays various screens according to control performed by the CPU 111. The host apparatus 1 communicates with peripheral devices, such as the printer 2, via a communication interface (I/F) 114.

Figure 2A:
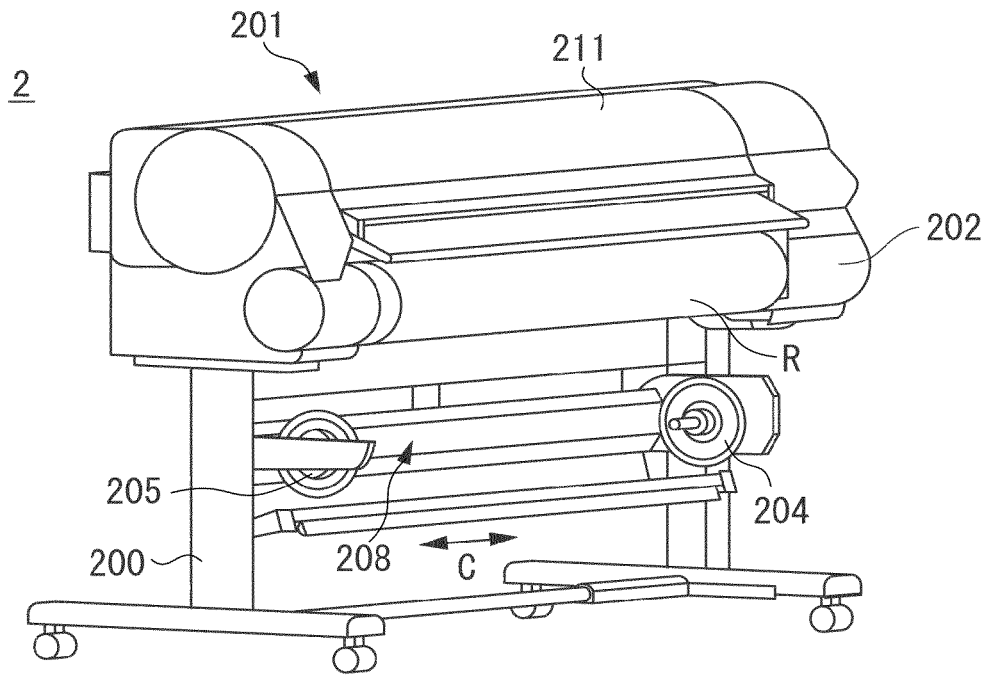
FIGS. 2A and 2B are external perspective views illustrating a printing apparatus to which the present invention is applicable.

FIG. 2A is a schematic perspective view illustrating the printer 2. Referring to FIG. 2A, the printer 2 includes an apparatus main body (i.e., a main body unit) 201 mounted on top of a stand 200. A roll of a print medium (i.e., roll paper) R, which is wound on a paper core, is set in a front side of the main body unit 201. Further, a paper feed mechanism 202, including a paper feed unit that unwinds and feeds (conveys) the print medium R to a printing position and a rewinding unit for rewinding the unwound print medium, is located in the main body unit 201. The print medium R, which has been unwound from the paper feed mechanism 202, is turned around and conveyed so that an image is printed at the printing position. The print medium R is then discharged from the front side of the main body unit 201.

A winding apparatus for taking up the print medium R on which the image has been printed by the main body unit 201 is located below the main body unit 201. The winding apparatus takes up the print medium discharged from the main body unit 201 onto a paper core (not illustrated) held between a take-up driving unit 204 and a take-up movable unit 205. A motor (not illustrated), which rotates the paper core based on a signal from an encoder, is included inside the take-up driving unit 204. Further, the take-up movable unit 205 is movable in a width direction indicated by a double-headed arrow C illustrated in FIG. 2A. The user can thus move the take-up movable unit 205 according to a length of the paper core (i.e., a width size of the print medium) held between the take-up driving unit 204 and the take-up movable unit 205.

Figure 2B:
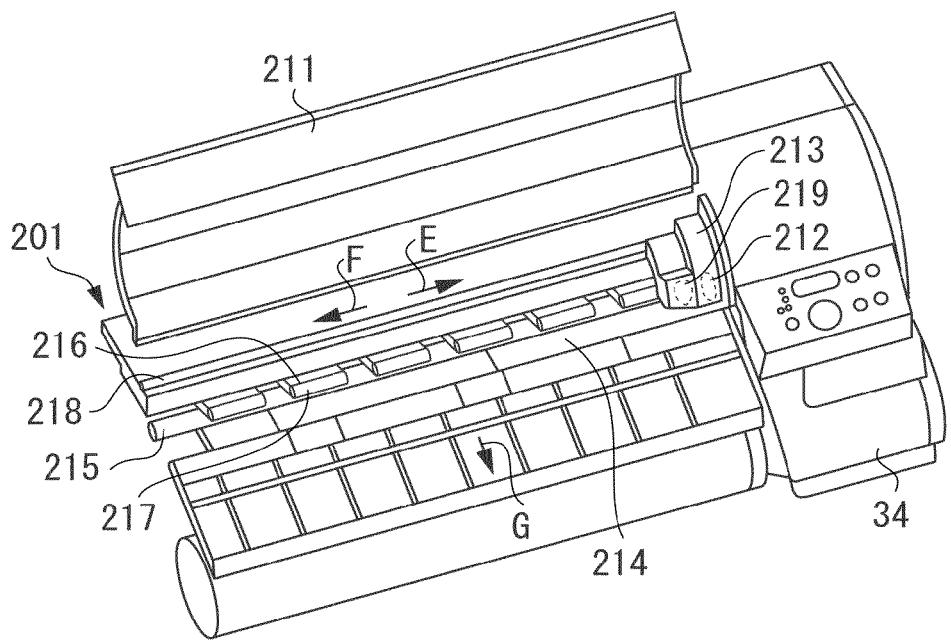

FIG. 2B is a perspective view illustrating an interior portion of the main body unit 201. Referring to FIG. 2B, an open-close cover 211 is located on an upper side of the main body unit 201, and an internal mechanism becomes accessible by opening the open-close cover 211. A carriage 213 on which a print head 212 is mounted, and which is capable of moving back and forth with respect to the width direction of the print medium, is located in the main body unit 201. A platen 214 for guiding and supporting the print medium on which the print head 212 prints an image is positioned facing the print head 212. A conveyance roller 215 for conveying (i.e., feeding) the print medium R is located upstream, with respect to a conveyance direction, of the platen 214 (i.e., according to the present exemplary embodiment, at a position towards the print medium R on the paper core set in the paper feed mechanism 202, in a U-turn conveyance path inside the main body unit 201). A plurality of pinch rollers 217, which is pivotally supported by a roller holder 216, is pressed against the conveyance roller 215 by an elastic force so that a conveyance force is applied to the print medium R held between the conveyance roller 215 and the pinch rollers 217.

The printer 2 prints an image by discharging ink from the print head 212 to the print medium according to the print data while moving (i.e., performing main scanning of) the carriage 213 along a rail 218 in directions indicated by arrows E and F illustrated in FIG. 2B. The printer 2 prints one line in synchronization with the movement of the carriage 213, and the conveyance roller 215 conveys (i.e., feeds) the print medium in the direction indicated by an arrow G illustrated in FIG. 2B by a predetermined pitch. The printer 2 prints the image on the print medium R by alternately repeating these processes.

A cutter unit 219 for cutting the recording medium R is mounted on the carriage 213. A blade in the cutter unit 219 comes out by moving the carriage 213 in a main scanning direction and abutting the cutter unit 219 against a pushing member. The carriage 213, in such a state, is then moved in the directions indicated by the arrow E or the arrow F so that the cutter unit 219 cuts the recording medium R. There is a protrusion similar to the pushing member on an opposite side with respect to a moving direction of the carriage 213, and the blade in the cutter unit 219 retracts by abutting against the protrusion.

A sensor unit (not illustrated), which includes various light-emitting diodes (LEDs), capable of detecting an edge position and thickness of various print media is attached to the carriage unit 213. The sensor unit can calculate the width of the print medium R from a difference between positional information of a left edge and a right edge of the print medium R. If the left and right edges of the print medium R are not uniform, the medium width can be identified by causing the user to input the medium width when attaching the medium. A medium presence sensor (not illustrated) is located on the platen 214 upstream with respect to the conveyance direction, separately from the sensor unit. The medium presence sensor is an optical sensor configured by a light-emitting element and a light-receiving element. The medium presence sensor detects the presence or absence of the print medium R by emitting light from the light-emitting element and receiving reflected light by the light-receiving element.

A procedure for displaying the print preview is described below. The user creates an arbitrary document or an image using the application 102, and issues a print instruction from a menu included in the application 102. A print dialog is then activated. Generally, the user can confirm or change the setting of the selected printer driver 103 by pressing a property button or the like from the print dialog in the application 102.

Figure 3:
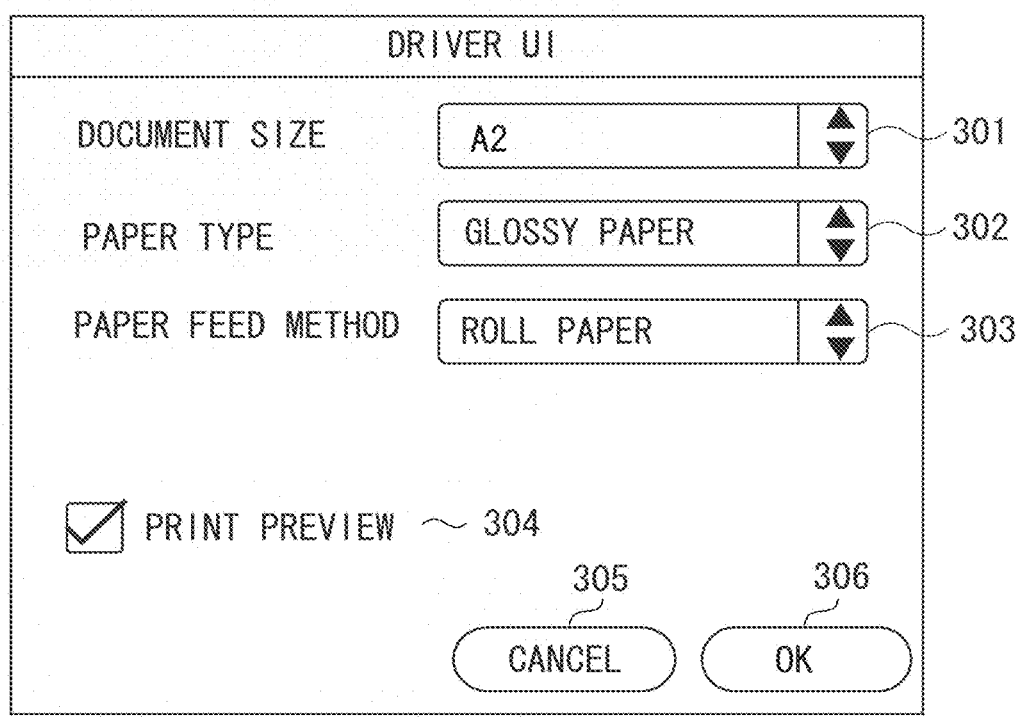
FIG. 3 illustrates an example of a printer driver setting screen according to an exemplary embodiment of the present invention.

FIG. 3 illustrates an example of a user interface of a setting screen displayed by the printer driver 103. Referring to FIG. 3, the user interface includes a document size list box 301, a paper type list box 302, a paper feed method list box 303, and a check box 304 for performing a print preview. Further, the user interface includes a cancel button 305 and an OK button 306. The user can set a size of a document (i.e., a medium on which printing is to be performed) on the document size list box 301. According to the present exemplary embodiment, the printer 2 cuts the roll paper on which printing is performed using the cutter unit 219 so that the printer 2 can print the image on the print medium of a predetermined size.

The example illustrated in FIG. 3 indicates the case where the user has set A2 as the document size. The user can set the paper type (i.e., the type of the print medium) on the paper type list box 302, and the example illustrated in FIG. 3 indicates that the user has set glossy paper as the paper type. Furthermore, the user can set the paper feed method to be performed when printing using the paper feed method list box 303, and the example illustrated in FIG. 3 indicates that the user has set the roll paper. Moreover, the user can use the check box 304 for performing print preview to activate a print preview process before printing. If the user checks the check box 304, the print preview process is activated before printing. The example illustrated in FIG. 3 indicates that the user has checked the check box 304 for performing the print preview.

If the user then presses the OK button 306 in the state where the above-described settings are specified, the setting of the printer driver 103 is determined, and the user interface display ends. On the other hand, if the user presses the cancel button 305, the settings that have been changed do not become effective, and an initial setting or previously-set contents of the printer driver 103 are used. The user interface display of the printer driver 103 then ends.

If the user presses a control button, such as a print start button, from the print dialog in the application 102 after completing the settings on the printer driver 103, the print data is transferred to the printer driver 103. In the case where the user has checked the check box 304 for performing the print preview as illustrated in FIG. 3, the print data is transferred to the print preview control unit 106, and a print preview activation process is started.

Figure 4:
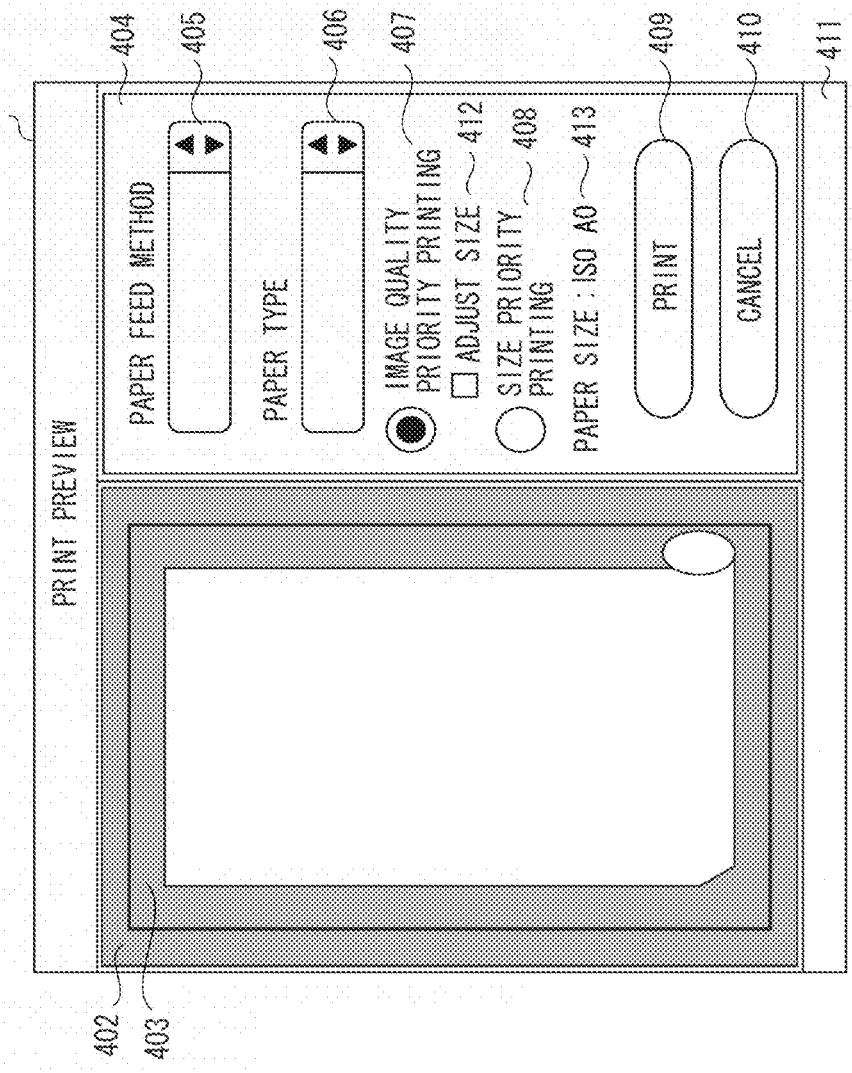
FIG. 4 illustrates an example of a print preview screen according to the exemplary embodiment.

FIG. 4 is an example of a print preview user interface displayed by the print preview control unit 106. Referring to FIG. 4, a print preview dialog 401 includes a print preview display portion 402 and a setting display-change portion 404. The print preview display portion 402 displays a paper image 403. The setting display-change portion 404 includes a paper feed method list box 405, a paper type list box 406, an image quality priority printing radio button 407, a size priority printing radio button 408, and a check box 412 for adjusting the size. Further, the setting display-change portion 404 includes an output paper size display area 413, a print button 409, and a cancel button 410.

The setting contents that are previously acquired by the printer driver 103 are reflected as default values in the paper feed method list box 405 and the paper type list box 406. The paper image 403 displays a paper image of the paper feed method designated in the paper feed method list box 405. FIG. 4 illustrates a state in which the roll paper is displayed. The user can change the setting of the paper type (i.e., the type of the print medium) using the paper type list box 406. A print setting information display portion 411 displays the information related to the print setting.

When the print preview dialog 401 is activated, either the image quality priority printing radio button 407 or the size priority printing radio button 408 is selected as default, according to the type of the print medium previously acquired by the printer driver 103. According to the present exemplary embodiment, if the type of the print medium is glossy paper, the image quality priority printing radio button 407 is selected as default. If the type of the print medium is plain paper, the size priority printing radio button 408 is selected as default. When the user changes the checking position of the radio button, the print method set as default can be changed. As described above, according to the present exemplary embodiment, printing can be performed in an image quality priority printing mode (i.e., a first print mode) or a size priority printing mode (i.e., a second print mode).

According to the present exemplary embodiment, if the user selects the image quality priority printing, the conveyance amount for every printing performed by the printer 2 can be adjusted by a conveyance adjustment amount. The conveyance adjustment amount adjusts the conveyance amount so that a boundary streak between the bands is not generated. The conveyance adjustment amount is adjusted by increasing or decreasing the conveyance amount that has been theoretically designed, according to the type of the print medium. The conveyance adjustment amount can be previously stored in a memory in the printer 2 for each type of print medium by a user input via the input unit 116 in the host apparatus 1 or an operation unit in the printer 2. Further, when a type of the print medium is used for the first time in the printer 2, a test pattern may be generated for each type of print medium. A multi-sensor installed in the printer 2 reads the test pattern, calculates the adjustment amount, and stores the calculated adjustment amount in the memory in the printer 2. The conveyance amount is adjusted by increasing or decreasing at a constant interval a number of pulses for rotating a stepping motor that drives the conveyance roller in the printer 2.

According to the present exemplary embodiment, the information for designating the conveyance adjustment amount (i.e., conveyance adjustment amount information) is configured as "increase or decrease in the number of pulses/adjustment interval". For example, if the conveyance amount is to be adjusted (increased) by increasing the number of pulses for rotating the stepping motor by 1 pulse for each 200 pulses, the information for designating the conveyance adjustment amount is configured as an attribute value such as "increase in the number of pulses/adjustment interval 200".

According to the present exemplary embodiment, each conveyance amount is corrected using a conveyance correction amount, previous to the adjustment by the conveyance adjustment amount for reducing the boundary streak. For example, if there is a type of print medium that tends to slip, the actual conveyance amount may differ from the theoretically designed conveyance amount (i.e., a reference conveyance amount). To solve such an issue, the conveyance correction amount is set for each type of print medium so that the print medium is conveyed according to the theoretically designed conveyance amount. If the user has selected the size priority printing, the conveyance amount is corrected by the conveyance correction amount to convey the print medium according to the theoretically designed reference conveyance amount. On the other hand, if the user has selected the image quality priority printing, the conveyance amount is corrected by the conveyance correction amount to convey the print medium according to the theoretically designed conveyance amount. The conveyance amount is then adjusted by the conveyance adjustment amount, so that the boundary streak is reduced.

Returning to the description of FIG. 4, if the user has checked the image quality priority printing radio button 407, the checkbox 412 for adjusting the size becomes checkable. If the image quality priority printing is selected and the conveyance amount is adjusted using the conveyance adjustment amount, the print range of the image to be printed may be enlarged or reduced. The user thus designates on the checkbox 412 whether to change the positions at which the print medium is cut associated with such enlargement and reduction, and perform adjustment to match the output paper size to the print range. The output paper size display area 413 displays the output paper size. If the user has checked the check box 412 for adjusting the size, the output paper size display area 413 displays the adjusted output paper size in terms of millimeters.

The user confirms the preview image of the image to be printed displayed on the print preview display unit 402. If the user then desires to print according to the confirmed content, the user presses the print button 409. The print data is thus output to the printer 2 and printed. On the other hand, if the user confirms the preview image displayed on the print preview display unit 402 and determines not to print, the user presses the cancel button 410 and closes the print preview dialog 401. The print preview control unit 106 in the printer driver 103 illustrated in FIG. 1 transmits to and receives from the printer 2 the information via the printer information acquisition setting unit 107.

A process for displaying the print preview performed in the host apparatus 1 is described below with reference to FIG. 6. In step S101, the host apparatus 1 displays the print preview dialog 401 and acquires the type of the print medium selected in the print type list box 406. In step S102, the host apparatus 1 acquires from the printer 2 the conveyance adjustment amount, i.e., performs a conveyance adjustment amount acquisition process.

FIG. 7 is a flowchart illustrating the process to be performed for acquiring the conveyance adjustment amount in step S102 illustrated in FIG. 6. The process for acquiring the conveyance adjustment amount is performed by the host apparatus 1 and the printer 2.

In step S201, the print preview control unit 106 in the host apparatus 1 transmits to the printer 2, via the printer information acquisition setting unit 107 a request for acquiring the conveyance adjustment amounts. In step S202, the printer 2 acquires the conveyance adjustment amount stored in the memory. More specifically, the printer 2 acquires all of the conveyance adjustment amounts stored in the memory that are associated with each paper type (i.e., the type of the print medium).

In step S203, the printer 2 transmits the conveyance adjustment amounts set for each type of print medium to the host apparatus 1 via the printer information acquisition setting unit 107. In step S204, the host apparatus 1 acquires the conveyance adjustment amounts received from the printer 2. The process for acquiring the conveyance adjustment amounts then ends.

Returning to the FIG. 6, in step S103 of the print preview display process, the host apparatus 1 extracts the conveyance adjustment amount corresponding to the type of the print medium selected on the paper type list box 406 from among the conveyance adjustment amounts acquired from the printer 2. The host apparatus 1 then uses the extracted conveyance adjustment amount to generate print preview data. According to the present exemplary embodiment, the host apparatus 1 generates three types of data pieces as the print preview data. The first data piece is generated by adjusting only the conveyance amount and not adjusting the output paper size. The second data piece is generated by adjusting both the conveyance amount and the output paper size. The third data piece is generated by not adjusting the conveyance amount. If the conveyance amount is not, a value of a resolution of the print data in the conveyance direction that is set in the print preview control unit 106 is directly employed. However, if the conveyance amount is adjusted, the resolution is calculated by referring to the conveyance adjustment amount acquired in step S102.

For example, if the conveyance amount is adjusted (increased) by increasing the number of pulses for rotating the stepping motor by 1 pulse for each 200 pulses, the resolution of the print data in the conveyance direction is calculated using equation 1 as follows. In equation 1, the resolution set in the print preview control unit 106 is 100 dots per inch (DPI), and the conveyance adjustment amount information is "increase in the number of pulses/adjustment interval 200".

$$100\ (DPI)*200/201 = 99.50\ (DPI) \quad \text{(equation 1)}$$

According to the present exemplary embodiment, a display resolution of the preview image displayed on the print preview screen is changed according to the conveyance adjustment amount, and the preview image is displayed according to the changed resolution. As a result, the print range of the print data in the preview image matches the print range of the print data when the print data is actually printed.

Figure 8:
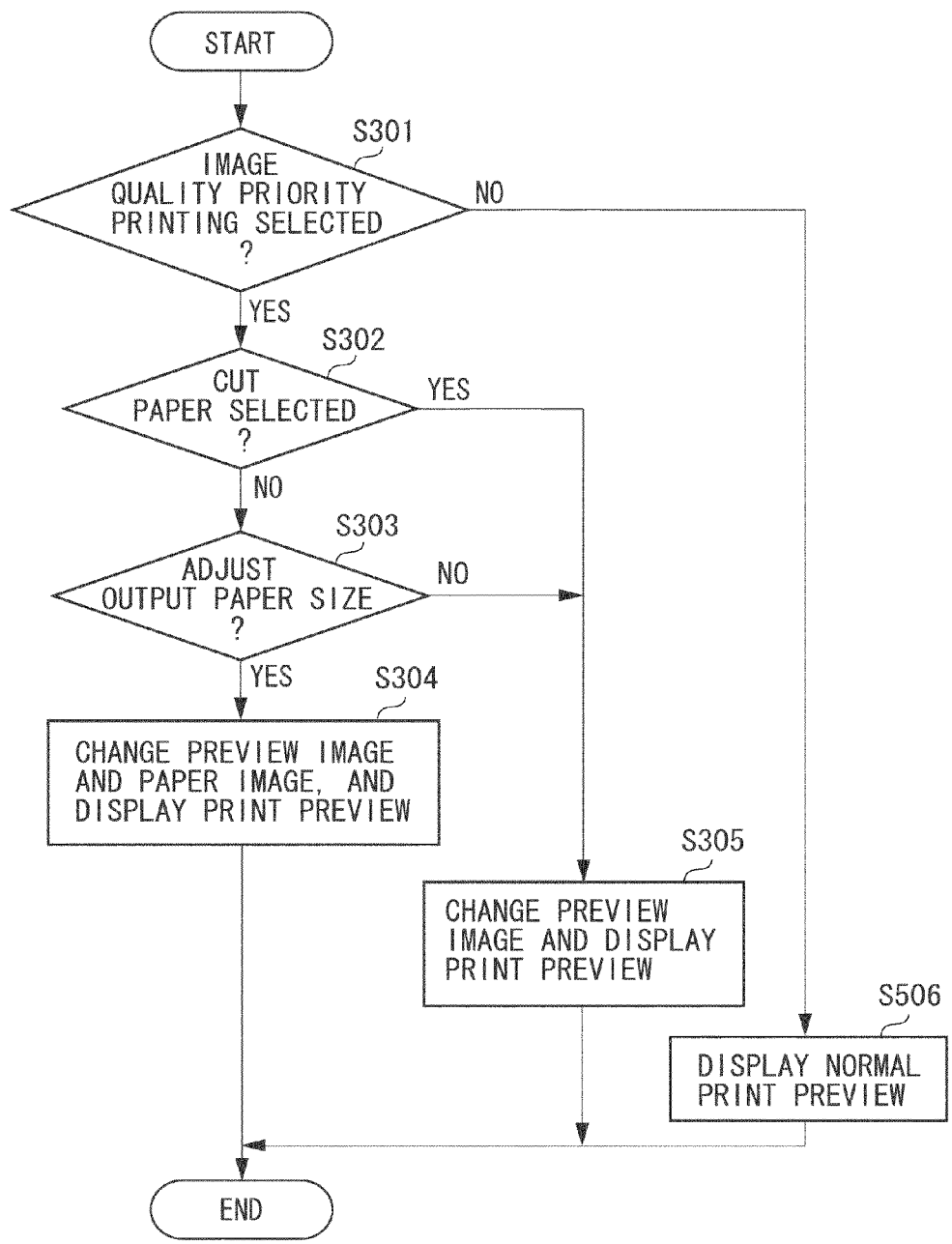
FIG. 8 is a flowchart illustrating a print preview display process according to the exemplary embodiment.

FIG. 8 is a flowchart illustrating the process for displaying the preview image of the image to be printed performed in step S104 in FIG. 6. In step S301, the host apparatus 1 determines whether the image quality priority printing radio button 407 or the size priority printing radio button 408 is selected on the print preview dialog 401. If the host apparatus 1 determines that the image quality priority printing is selected (YES in step S301), the process proceeds to step S302. On the other hand, if the host apparatus 1 determines that the size priority printing is selected (NO in step S301), the process proceeds to step S306.

In step S306, the host apparatus 1 performs a normal print preview with respect to the print data generated by the printer driver 103. In other words, the host apparatus 1 does not change the resolution or the preview image as described above.

In step S302, the host apparatus 1 determines whether the cut paper is selected in the paper feed method list box 405. If the cut paper is selected (YES in step S302), the output paper size is not changed, so that there is no effect due to change in the output paper size. The process then proceeds to step S305. In step S305, the host apparatus 1 calculates the resolution of the preview image based on the acquired conveyance adjustment amount, and displays the preview image according to the calculated resolution.

On the other hand, if the roll paper is selected in the paper feed method list box 405 (NO in step S302), the host apparatus 1 determines that the cut paper is not selected. The process then proceeds to step S303. In step S303, the host apparatus 1 determines whether the check box 412 for adjusting the size is checked. If the host apparatus 1 determines that the check box 412 is not checked (NO in step S303), the process proceeds to step S305. In step S305, the host apparatus 1 calculates the resolution based on the conveyance adjustment amount, and displays the preview image according to the calculated resolution. Further, since the output paper size is not changed, the print preview is displayed based on the paper image 403 designated on the host apparatus 1.

If the host apparatus 1 determines that the check box 412 for adjusting the size is checked (YES in step S303), the process proceeds to step S304. In step S304, the host apparatus 1 calculates the resolution based on the conveyance adjustment amount, and displays the preview image according to the calculated resolution. Further, since the output paper size is changed along with adjustment of the conveyance amount, the host apparatus 1 enlarges or reduces the paper size image 403 designated in the host apparatus 1 according to the conveyance adjustment amount, and displays the print preview.

FIGS. 5A through 5E illustrate how the preview image of the image to be printed is displayed in the print preview dialog 401 according to the present exemplary embodiment. According to the present exemplary embodiment, the print preview function processes, when adjusting the conveyance amount, the preview image so that a portion in which the print range is changed due to the adjustment will be recognizable. Further, the print preview function displays a message in the print setting information display portion 411.

Figure 5A:
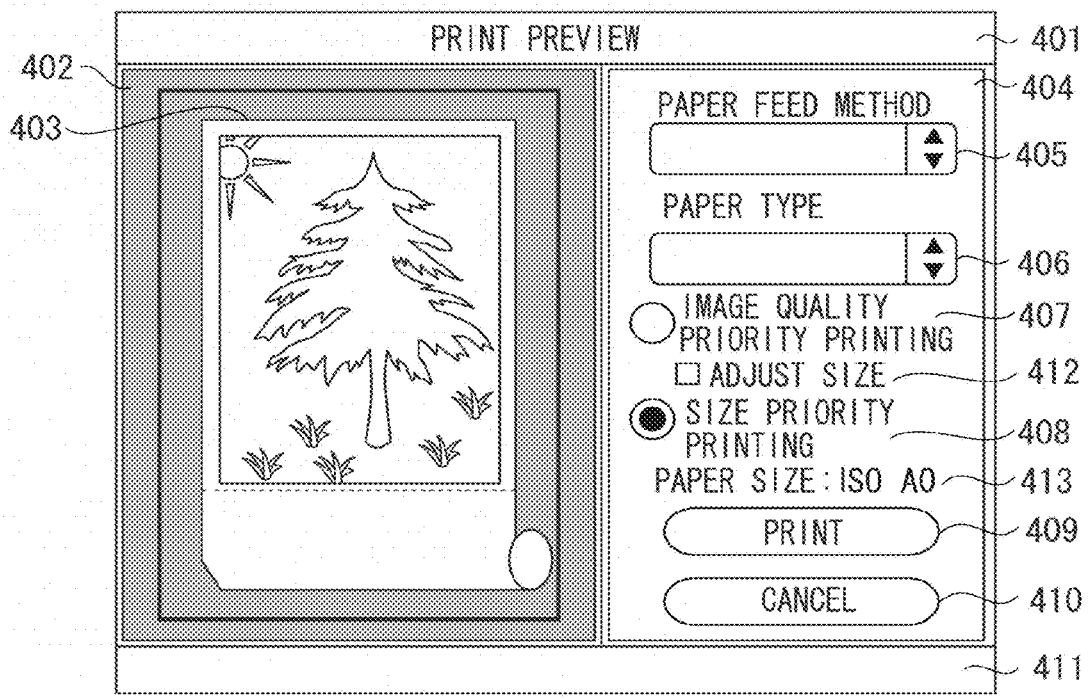
FIGS. 5A, 5B, 5C, 5D, and 5E illustrate display examples of the print preview screen according to the exemplary embodiment.

FIG. 5A illustrates a display example when the size priority printing is designated, and the host apparatus 1 determines in step S306 illustrated in FIG. 8 that the normal print preview is to be displayed. In such a case, the process for changing the resolution based on the conveyance adjustment amount is not performed in the print preview, and the print data of the printer driver 103 is displayed directly as the print preview. Further, the message regarding the conveyance amount adjustment is not displayed in the print setting information display portion 411. Furthermore, since there is no change in the output paper size, the host apparatus 1 displays, for example, "ISO A0" in the output paper size display area 413.

Figure 5B:
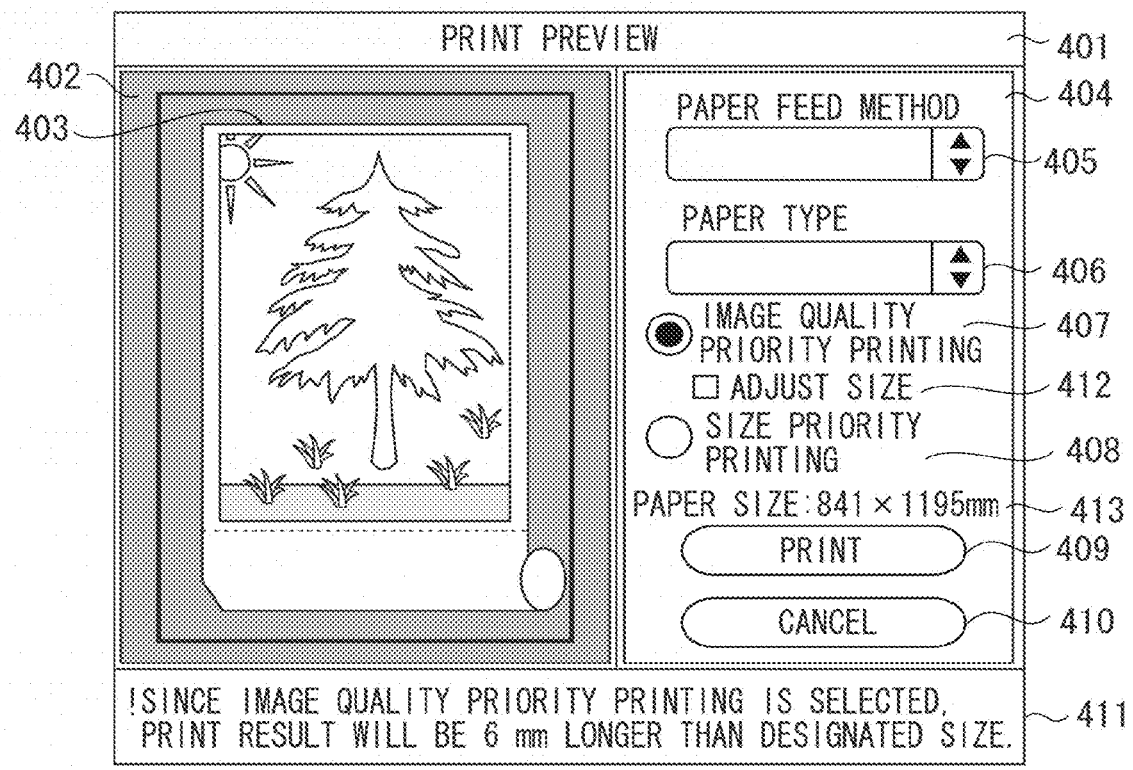

FIG. 5B illustrates an example of the print preview displayed when the image quality priority printing is designated, and the output paper size is to be changed (i.e., the process performed in step S304 illustrated in FIG. 8). In the example illustrated in FIG. 5B, the print data size is "A0 (841 mm×1189 mm)", upper and lower margins of the print medium is "3 mm", the conveyance adjustment amount is "increase in number of pulses/adjustment interval 200", and the print resolution is "100 DPI". In such a case, the number of pulses for driving the paper feed motor increases by 1 pulse for each 200 pulses, so that the print range becomes approximately 6 mm longer as indicated in the following equation 2.

$$(1189-6) \text{ mm}/200 = 5.90 \text{ mm} \quad \text{(equation 2)}$$

The print data is generated for the paper size A0 (841 mm×1189 mm) including printer margins. The host apparatus 1 thus displays "841 mm×1195 mm" in the output paper size display area 413, and a message such as "Since image quality priority printing is selected, print result will be 6 mm longer than designated size" in the print setting information display portion 411. In other words, the host apparatus 1 notifies the user of the print range after the conveyance amount is adjusted. In addition, since 1 inch corresponds to 25.4 mm, if the print range becomes longer by 5.90 mm, the print range and the output paper size increase by a number of dots calculated using the following equation 3.

According to the present exemplary embodiment, as illustrated in FIG. 5B, a rectangular area corresponding to 23 dots in the lower portion of the preview image and the paper image is filled in. The user can thus identify the area in which the size has changed due to adjustment of the conveyance amount.

$$5.90/25.4 * 100 \text{ (DPI)} * 200/201 = 23 \text{ (DOT)} \quad \text{(equation 3)}$$

Figure 5C:
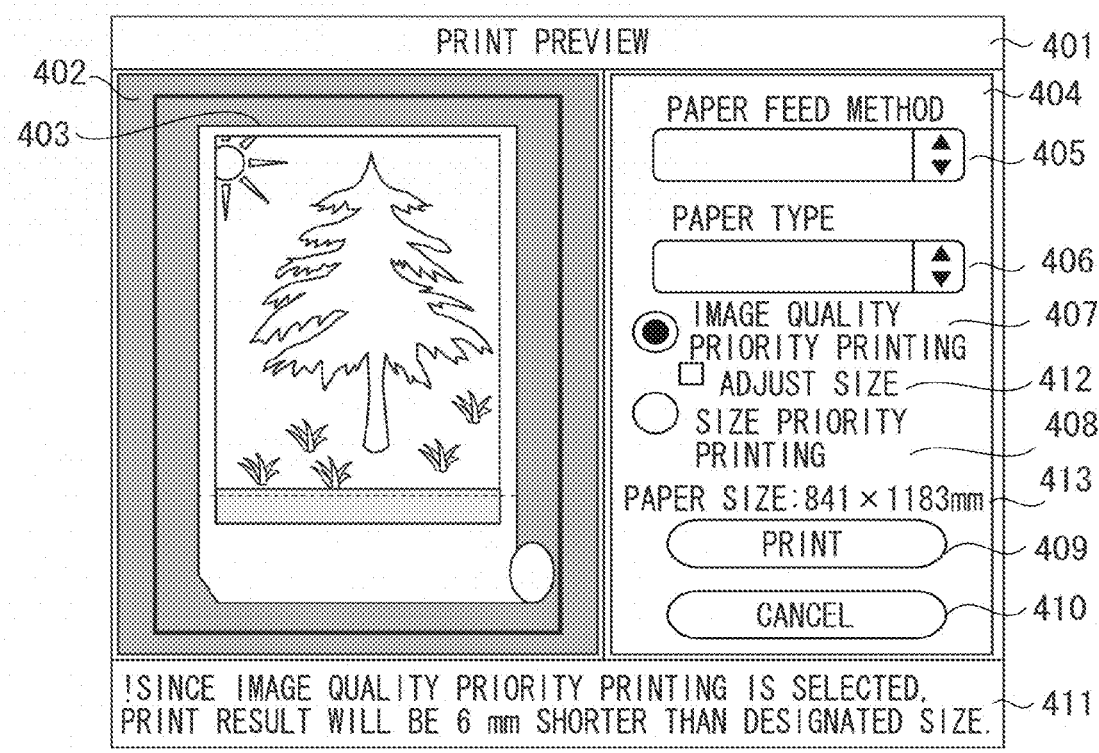

FIG. 5C illustrates another example of the print preview displayed in the case where the image quality priority printing is designated, and the output paper size is to be changed (i.e., the process performed in step S304 illustrated in FIG. 8). In the example illustrated in FIG. 5C, the print data size is "A0 (841 mm×1189 mm)", the upper and lower margins of the print medium is "3 mm", the conveyance adjustment amount is "decrease in number of pulses/adjustment interval 200", and the print resolution is "100 DPI". In such a case, the number of pulses for driving the paper feed motor decreases by 1 pulse for each 200 pulses, so that the print range becomes approximately 6 mm shorter.

The print data is generated for the paper size A0 (841 mm×1189 mm) including the printer margins. The host apparatus 1 thus displays "841 mm×1183 mm" in the output paper size display area 413, and the message such as "Since image quality priority printing is selected, print result will be 6 mm shorter than designated size" in the print setting information display portion 411. Further, since the print range and the output paper size have become shorter than the original lengths, a rectangular area is added to a rear end of the preview image as illustrated in FIG. 5C to visually display the changed portion.

Figure 5D:
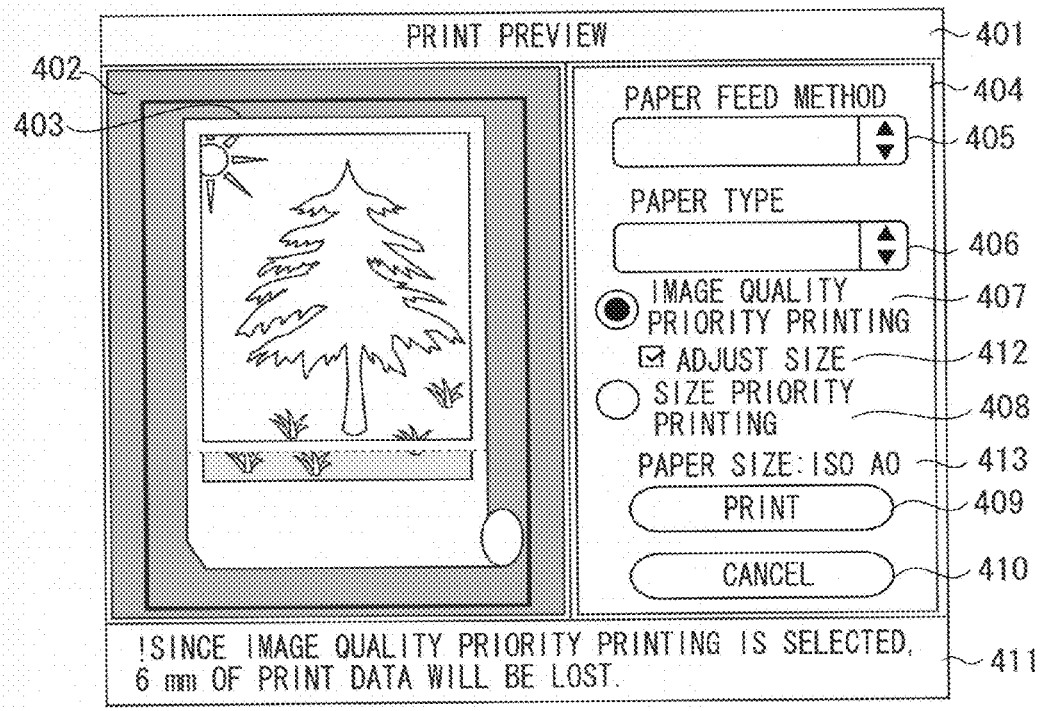

FIG. 5D illustrates an example of the print preview displayed when the image quality priority printing is designated, and the output paper size is not to be changed (i.e., the process performed in step S305 illustrated in FIG. 8). In the example illustrated in FIG. 5D, the print data size is "A0 (841 mm×1189 mm)", the upper and lower margins of the print medium is "3 mm", the conveyance adjustment amount is "increase in number of pulses/adjustment interval 200", and the print resolution is "100 DPI". In such a case, the number of pulses for driving the paper feed motor increases by 1 pulse for each 200 pulses, so that the print range becomes approximately 6 mm longer.

Since the print data becomes longer while the output paper size does not change, a portion of the print data may be lost in the print preview illustrated in FIG. 5D. The host apparatus 1 thus displays in the print setting information display portion 411 a message such as "Since image quality priority printing is selected, 6 mm of the print data will be lost". Further, the host apparatus 1 displays in the output paper size display area 413 "ISO A0". Furthermore, the host apparatus 1 adds a rectangular area to the rear end of the preview image to visually display the portion that will be lost in the print image.

Figure 5E:
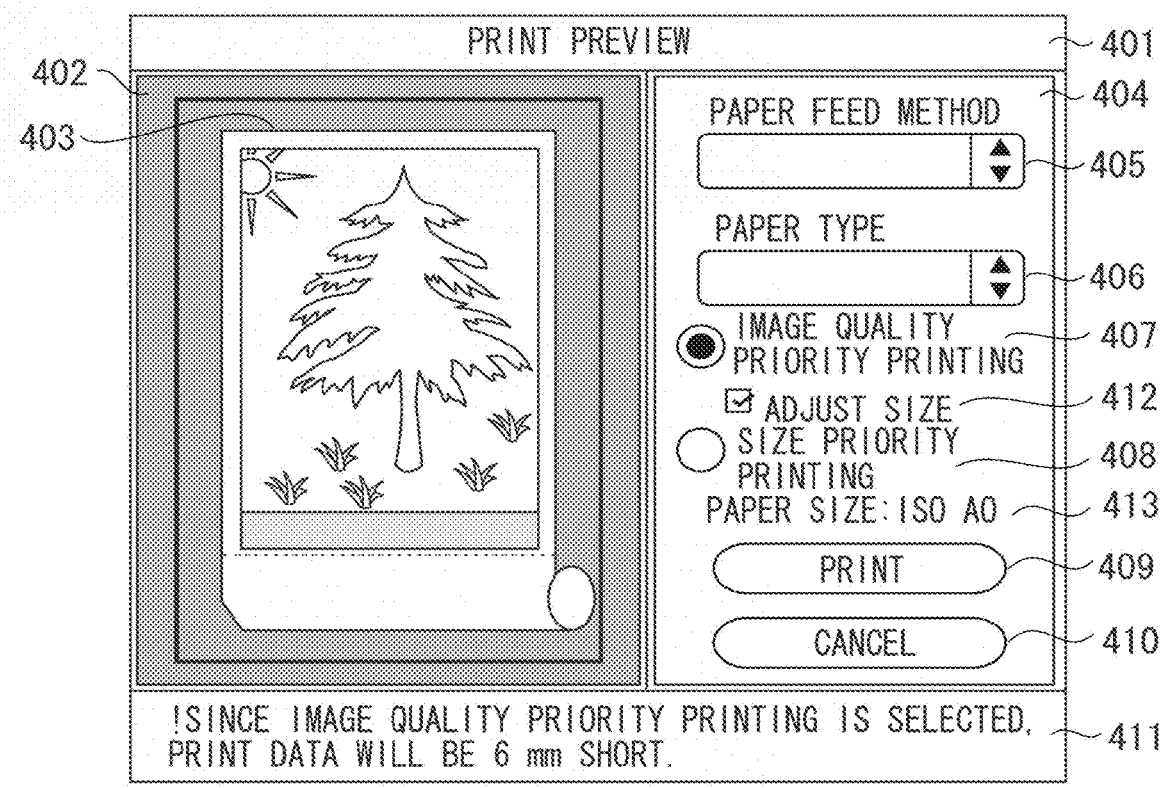

FIG. 5E illustrates another example of the print preview displayed when the image quality priority printing is designated, and the output paper size is not to be changed (i.e., the process performed in step S304 illustrated in FIG. 8). In the example illustrated in FIG. 5E, the print data size is "A0 (841 mm×1189 mm)", the upper and lower margins of the print medium is "3 mm", the conveyance adjustment amount is "decrease in number of pulses/adjustment interval 200", and the print resolution is "100 DPI". In such a case, the number of pulses for driving the paper feed motor decreases by 1 pulse for each 200 pulses, so that the print range becomes approximately 6 mm shorter.

Since the print data becomes shorter while the output paper size does not change, a blank space is generated in the rear end of the print medium in the print preview illustrated in FIG. 5E. The host apparatus 1 thus displays in the print setting information display portion 411 a message such as "Since image quality priority printing is selected, print data will be 6 mm short". Further, the host apparatus 1 displays in the output paper size display area 413 "ISO A0". Furthermore, the host apparatus 1 adds a rectangular area to the rear end of the preview image to visually display the shortened portion of the print image.

As described above, according to the present exemplary embodiment, if the conveyance amount is adjusted, the display size of the preview image in the print preview screen is changed according to the conveyance adjustment amount as illustrated in FIGS. 5B, 5C, 5D, and 5E. As a result, according to the present exemplary embodiment, the print range in the print preview screen can be matched to the print range when actually performing printing. Further, according to the present exemplary embodiment, if the output paper size (i.e., the size of the print medium) is changed according to the change in the print range, the change in the output paper size is reflected in the paper image. The content displayed in the print preview thus becomes closer to the actual print result.

Returning to the flowchart illustrated in FIG. 6, in step S105, the host apparatus 1 determines whether the print mode is changed. In other words, the host apparatus 1 determines whether the user has changed the settings on the image quality priority printing radio button 407, the size priority printing radio button 408, and the check box 412 for adjusting the size in the print preview dialog 401. If the user has changed the print mode (YES in step S105), it becomes necessary to switch displaying of the print preview data. The process thus returns to step S104, and the host apparatus 1 performs the print preview data display process. If the user has not changed the print mode (NO in step S105), the process proceeds to step S106.

In step S106, the host apparatus 1 determines whether the type of the print medium is changed in the print preview dialog 401. Since the conveyance adjustment amount is set for each type of the print medium, if the type of the print medium is changed (YES in step S106), it becomes necessary to regenerate the print preview data. The process thus returns to step S103, and the host apparatus 1 performs a print preview data generation process. If the type of the print medium is not changed (NO in step S106), the process proceeds to step S107.

In step S107, the host apparatus 1 determines whether the user has pressed the print button 409 in the print preview dialog 401. If the user has pressed the print button 409 (YES in step S107), the process proceeds to step S108. In step S108, the host apparatus 1 performs a conveyance adjustment amount setting process. If the user has not pressed the print button 409 (NO in step S107), the process returns to step S105.

Figure 9:
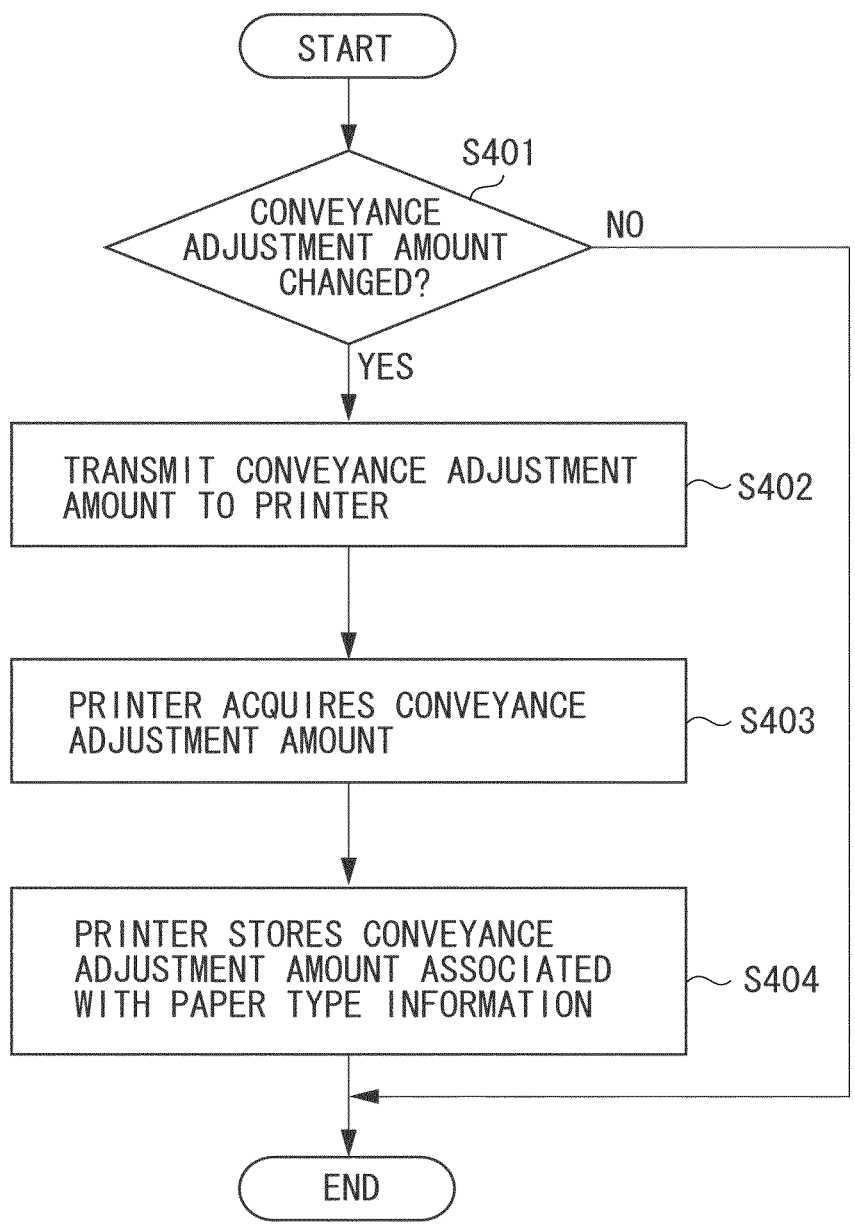
FIG. 9 is a flowchart illustrating a conveyance adjustment amount setting process according to the exemplary embodiment.

FIG. 9 is a flowchart illustrating the conveyance adjustment amount setting process in step S108 illustrated in FIG. 6 performed by the host apparatus 1 and the printer 2. In step S401, the host apparatus 1 determines whether the conveyance adjustment amount is changed. According to the present exemplary embodiment, the host apparatus 1 determines that the conveyance adjustment amount is changed when the type of the print medium is changed in the paper type list box 406 in the print preview dialog 401. Further, the host apparatus 1 determines that the conveyance adjustment amount is changed when selection is changed from the size priority printing radio button 408 to the image quality priority printing radio button 407 in the print preview dialog 401. If the host apparatus 1 determines that the conveyance adjustment amount is changed (YES in step S401), the process proceeds to step S402.

In step S402, the host apparatus 1 transmits to the printer 2 via the printer information acquisition setting unit 107 the newly changed conveyance adjustment amount and information about the type of the print medium. In step S403, the printer 2 then acquires the conveyance adjustment amount and the information about the type of the print medium.

In step S404, the printer 2 stores the conveyance adjustment amount associated with the information about the newly changed type of the print medium. The printer 2 thus uses the stored conveyance adjustment amount when performing subsequent printing. The printer 2 stores in the memory the conveyance adjustment amount for each print medium. The host apparatus 1 may thus transmit to the printer 2 only the information about the type of the print medium, and the printer 2 may extract from the memory the conveyance adjustment amount based on the received information about the type of the print medium.

Returning to the flowchart illustrated in FIG. 6, in step S109, the host apparatus 1 performs a rendering process at the resolution designated in the printer driver 103 and generates the print data. In step S110, the host apparatus 1 transmits the print data to the printer 2. The print preview process according to the present exemplary embodiment thus ends.

As described above, according to the present exemplary embodiment, when the function for adjusting the conveyance amount is used, the print range of the image to be printed on the print medium can be matched to the print range to be displayed on the print preview.

According to the above-described exemplary embodiment, the conveyance adjustment amount is stored in the memory in the printer 2. However, the conveyance adjustment amount may be stored in the RAM 113 in the host apparatus 1, and may be acquired when a preview is performed. Further, it is not necessary to set the conveyance adjustment amounts for all types of the print media used in the printer 2, and may be set for a portion of the types of the print media. Furthermore, according to the present exemplary embodiment, the printer 2 is not limited to the inkjet type printer, and the printer may employ other print methods, such as a heat transfer method, as long as the printer can convey a print medium at a predetermined pitch and perform printing. Moreover, according to the present exemplary embodiment, the resolution of the preview image is changed according to the conveyance adjustment amount so that the print range of the print preview becomes the same as the actual print range. However, other methods may be employed as long as a preview image can be displayed so that a print range of a print preview becomes the same as an actual print range.

The present exemplary embodiment may be applied to a single printing apparatus (i.e., printer), or a printing system including a printing apparatus and an external apparatus (i.e., a host apparatus). In the case of a single printer, a print preview is displayed on a display unit in the printer similarly to the one in the above-described exemplary embodiment. Further, the host apparatus may be integrated with a display unit, i.e., a monitor, similarly to the one in the above-described exemplary embodiment, or may be separated from the display unit and perform control of displaying a preview image on the display unit.

The present invention may be realized by a program code configuring a computer-readable program for implementing the above-described print preview function, or a computer-readable storage medium storing such a program code. In such a case, the above-described processes are realized by a computer (i.e., a CPU or a micro-processing unit (MPU)) in the host apparatus or the printing apparatus, or a plurality of computers in collaboration reading and executing the program code. Such a computer-readable program for causing the computer to execute the above-described processes for setting a margin amount and a computer-readable storage medium storing such a program are included in the exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-129155 filed Jun. 9, 2011, which is hereby incorporated by reference herein in its entirety.

What is claimed is:

1. An apparatus that controls a display unit to display as a preview image an image to be printed on a print medium by a printing apparatus, the apparatus comprising:
a processor, wherein the processor is configured to control:
an acquiring unit configured to acquire, in a case where the printing apparatus adjust a conveyance amount by increasing or decreasing the conveyance amount of the print medium with respect to a standard conveyance amount for printing image data with a specified size, an adjustment amount of the conveyance amount of the print medium; and
a control unit configured to cause the display unit to display the image to be printed on the print medium as the preview image according to the adjustment amount acquired by the acquisition unit,
wherein a size of the preview image with respect to a conveyance direction is different from the specified size.

2. The apparatus according to claim 1, wherein the control unit is further configured to cause the display unit to display an amount of change in a size of the image with respect to the conveyance direction due to the adjustment amount.

3. The apparatus according to claim 1, wherein the control unit is further configured to cause the display unit to display the preview image so that an area in which a size of the image with respect to the conveyance direction changes due to the adjustment amount can be identified.

4. The apparatus according to claim 1, wherein the control unit is further configured to cause the display unit to display the image of the print medium on which the image is printed.

5. The apparatus according to claim 4, wherein the printing apparatus includes a cutting unit configured to cut the print medium, and wherein if a size of the image with respect to the conveyance direction changes due to the adjustment amount, a position at which the print medium is cut by the cutting unit can be changed, and wherein the control unit is further configured to cause the display unit to change and display the size of the image of the print medium according to a change in the position at which the print medium is cut.

6. The apparatus according to claim 5, wherein the control unit is further configured to cause the display unit to display the size of the print medium on which the image is printed and to change the size of the print medium to be displayed on the display unit according to the change in the position at which the print medium is cut.

7. The apparatus according to claim 1, wherein the printing apparatus prints in a first print mode where the image is printed on the print medium by adjusting the conveyance amount using the adjustment amount and in a second print mode where the image is printed on the print medium without adjusting the conveyance amount using the adjustment amount, and wherein the processor is further configured to control a designation unit configured to designate whether to print in the first print mode or in the second print mode.

8. The apparatus according to claim 1, wherein the adjustment amount is set for each type of print medium on which the printing apparatus prints the image.

9. The apparatus according to claim 1, wherein the printing apparatus prints the image by scanning the print medium with a print head, and wherein the adjustment amount is the adjustment amount of the conveyance amount for one scan performed by the print head.

10. The apparatus according to claim 1, wherein the control unit does not change the size of the preview with respect to a direction intersecting the conveyance direction.

11. A method for performing display control where a display unit displays as a preview image an image to be printed on a print medium by a printing apparatus, the method comprising:

acquiring, in a case where the printing apparatus adjust a conveyance amount by increasing or decreasing the conveyance amount of the print medium with respect to a standard conveyance amount for printing image data with a specified size, an adjustment amount of the conveyance amount of the print medium; and causing the display unit to display the image to be printed on the print medium as the preview image according to the acquired adjustment amount, wherein a size of the preview image with respect to a conveyance direction is different from the specified size.

12. The method according to claim 11, further comprising causing the display unit to display an amount of change in a size of the image with respect to the conveyance direction due to the adjustment amount.

13. The method according to claim 11, further comprising causing the display unit to display the preview image so that an area in which a size of the image with respect to the conveyance direction changes due to the adjustment amount can be identified.

14. The method according to claim 11, further comprising causing the display unit to display the image of the print medium on which the image is printed.

15. The method according to claim 14, wherein the printing apparatus includes a cutting unit configured to cut the print medium, and wherein if a size of the image with respect to the conveyance direction changes due to the adjustment amount, a position at which the print medium is cut by the cutting unit can be changed, and wherein the size of the image of the print medium is changed according to a change in the position at which the print medium is cut.

16. The method according to claim 15, wherein the size of the print medium on which the image is printed is displayed and the size of the print medium to be displayed on the display unit is changed according to the change in the position at which the print medium is cut.

17. The method according to claim 11, wherein the printing apparatus prints in a first print mode where the image is printed on the print medium by adjusting the conveyance amount using the adjustment amount and in a second print mode where the image is printed on the print medium without adjusting the conveyance amount using the adjustment amount, and wherein the method further comprises designating whether to print in the first print mode or in the second print mode.

18. The method according to claim 11, wherein the adjustment amount is set for each type of print medium on which the printing apparatus prints the image.

19. The method according to claim 11, wherein the printing apparatus prints the image by scanning the print medium with a print head, and wherein the adjustment amount is the adjustment amount of the conveyance amount for one scan performed by the print head.

20. A non-transitory computer-readable storage medium storing a program for causing a computer to execute the method of claim 11.

* * * * *